Dec. 23, 1958   L. A. MAJNERI   2,865,401
SHUT-OFF VALVE ASSEMBLY FOR FLUID PRESSURE SYSTEMS
Filed July 6, 1954   4 Sheets-Sheet 1
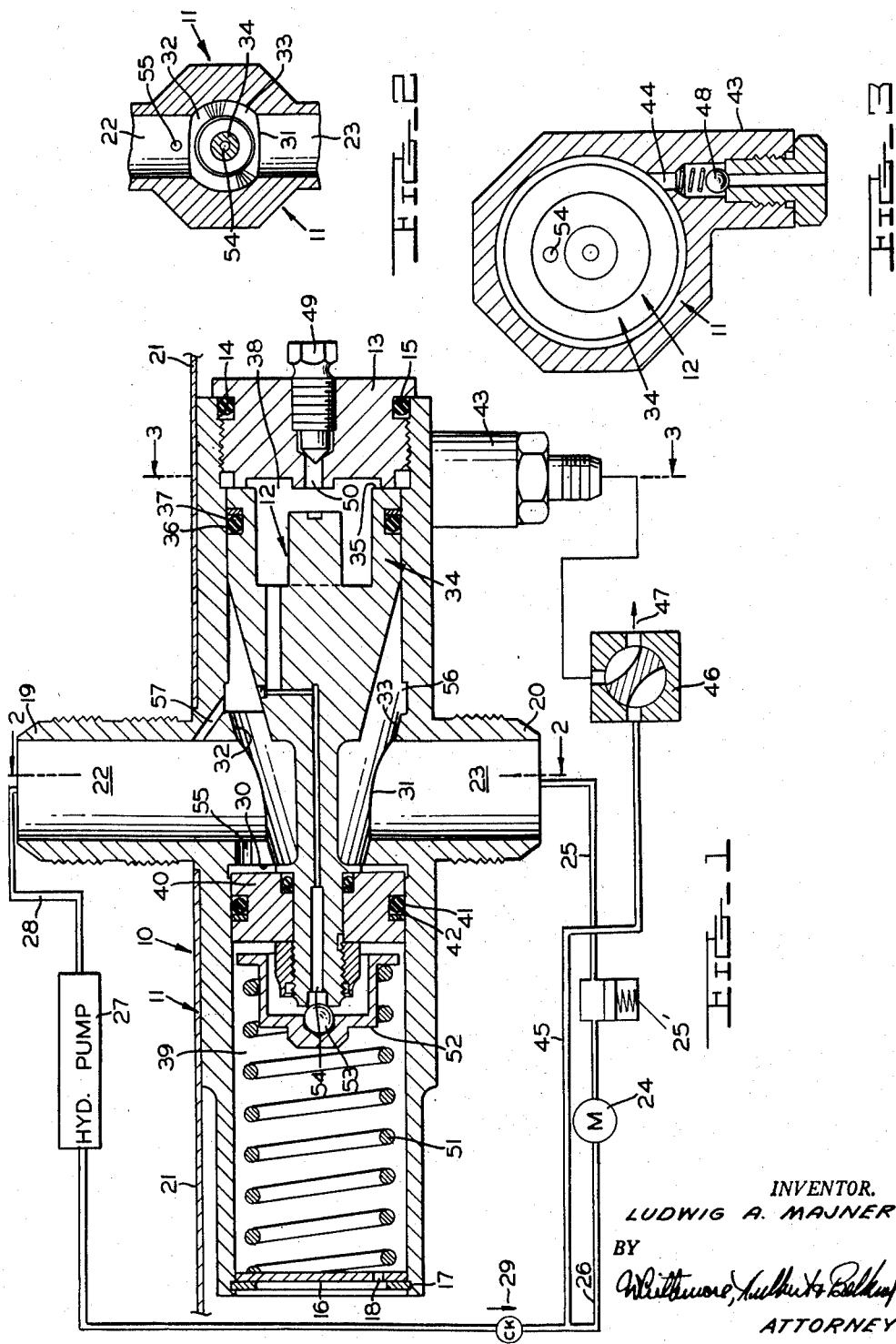
INVENTOR.
LUDWIG A. MAJNERI
BY
ATTORNEYS Dec. 23, 1958  L. A. MAJNERI  2,865,401
SHUT-OFF VALVE ASSEMBLY FOR FLUID PRESSURE SYSTEMS
Filed July 6, 1954  4 Sheets-Sheet 2
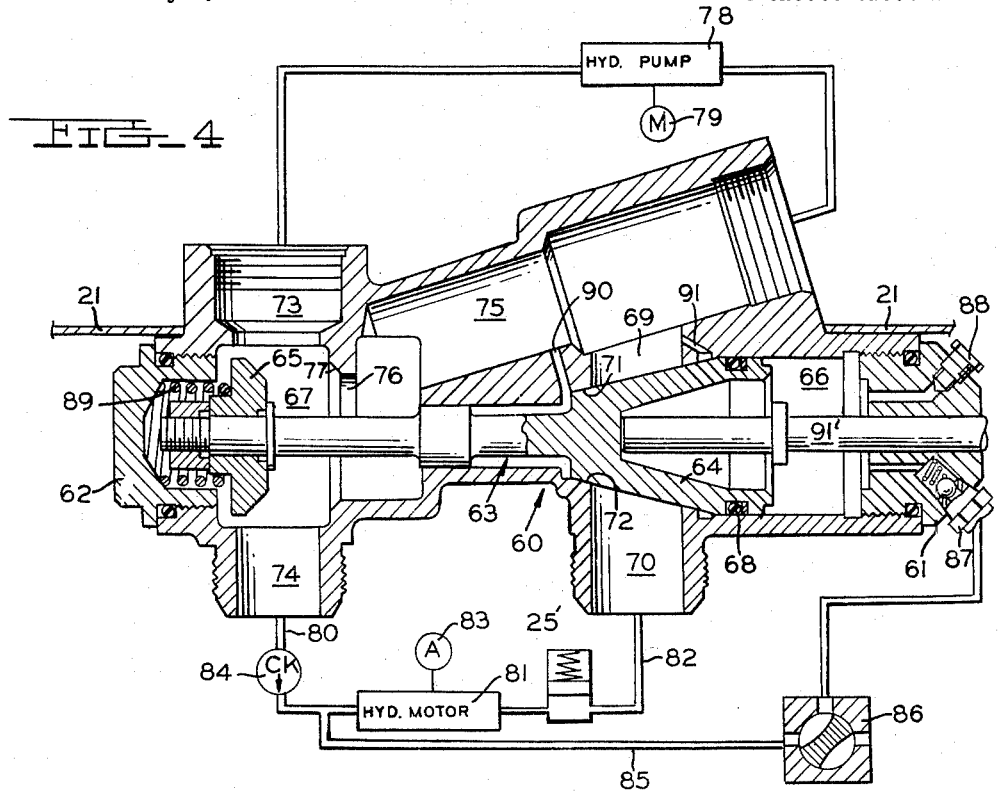
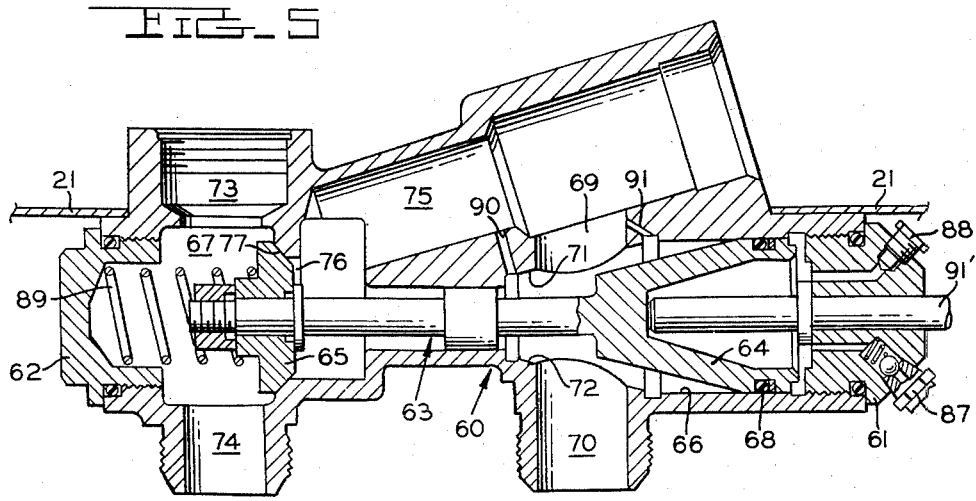
INVENTOR.
LUDWIG A. MAJNERI
BY
ATTORNEYS Dec. 23, 1958 L. A. MAJNERI 2,865,401
SHUT-OFF VALVE ASSEMBLY FOR FLUID PRESSURE SYSTEMS
Filed July 6, 1954 4 Sheets-Sheet 3
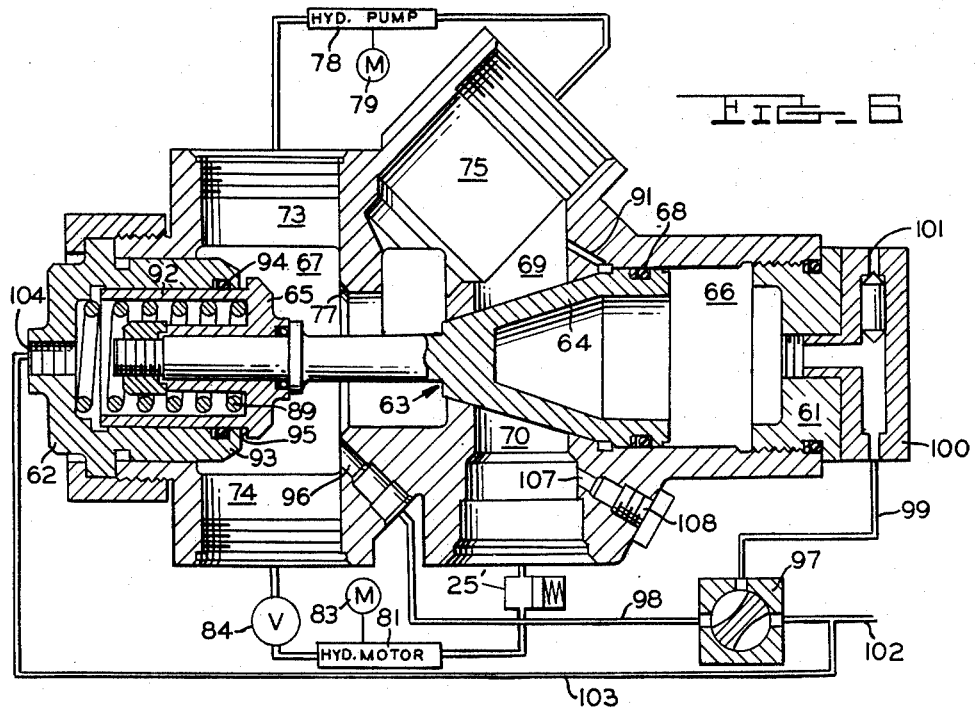
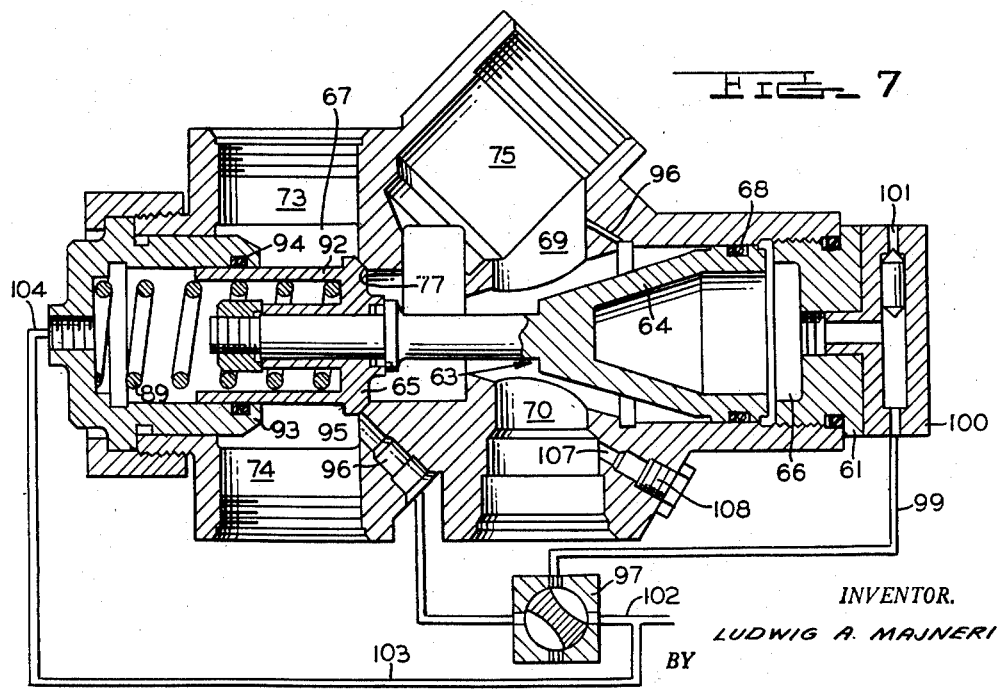
INVENTOR.
LUDWIG A. MAJNERI
BY
ATTORNEYS Dec. 23, 1958 L. A. MAJNERI 2,865,401
SHUT-OFF VALVE ASSEMBLY FOR FLUID PRESSURE SYSTEMS
Filed July 6, 1954 4 Sheets-Sheet 4

INVENTOR.
LUDWIG A. MAJNERI
BY
Whittemore, Hulbert & Belknap
ATTORNEYS

United States Patent Office 2,865,401
Patented Dec. 23, 1958

2,865,401

SHUT-OFF VALVE ASSEMBLY FOR FLUID PRESSURE SYSTEMS

Ludwig A. Majneri, Grosse Pointe, Mich.

Application July 6, 1954, Serial No. 441,347

1 Claim. (Cl. 137—625.29)

This invention relates generally to valve assemblies and refers more particularly to improvements in shut-off valves capable of being used in connection with fluid pressure systems for discontinuing the flow of fluid through said systems.

In certain types of fluid pressure systems such, for example, as hydraulic systems employed on aircraft to drive various accessories, it is customary to circulate the hydraulic fluid under substantial pressure through the system by a pump operatively connected to the engine of the aircraft and housed within a compartment which is usually protected by a fire wall.

In installations of the foregoing type, there is always a danger of fire breaking out in the pump compartment and it is an object of this invention to provide a valve assembly rendering it possible to discontinue circulation of hydraulic fluid through the system and thereby avoid feeding any fire that may break out within the compartment with hydraulic fluid escaping from the system through a damaged line or conduit of the system extending into the compartment.

It is another object of this invention to provide a valve assembly having provision for bypassing hydraulic fluid medium from the pressure side of the pump to the intake side when the valve assembly is in its closed position or, in other words, when the circulation of hydraulic fluid medium through the system is discontinued.

The foregoing as well as other objects will be made more apparent as this description proceeds especially when considered in connection with the accompanying drawings, wherein:

Figure 1 is a longitudinal sectional view through a valve assembly embodying the features of this invention;

Figure 2 is a sectional view taken on the line 2—2 of Figure 1;

Figure 3 is a sectional view taken on the line 3—3 of Figure 1;

Figure 5 is a longitudinal sectional view similar to Figure 4 showing the parts of the valve assembly in a different position;

Figure 6 is a longitudinal sectional view through a modified form of valve assembly and also illustrating the hydraulic system diagrammatically;

Figure 7 is a sectional view similar to Figure 6 showing the parts in a different position; and Figure 8 is a sectional view of still another form of valve assembly.

Figure 4:
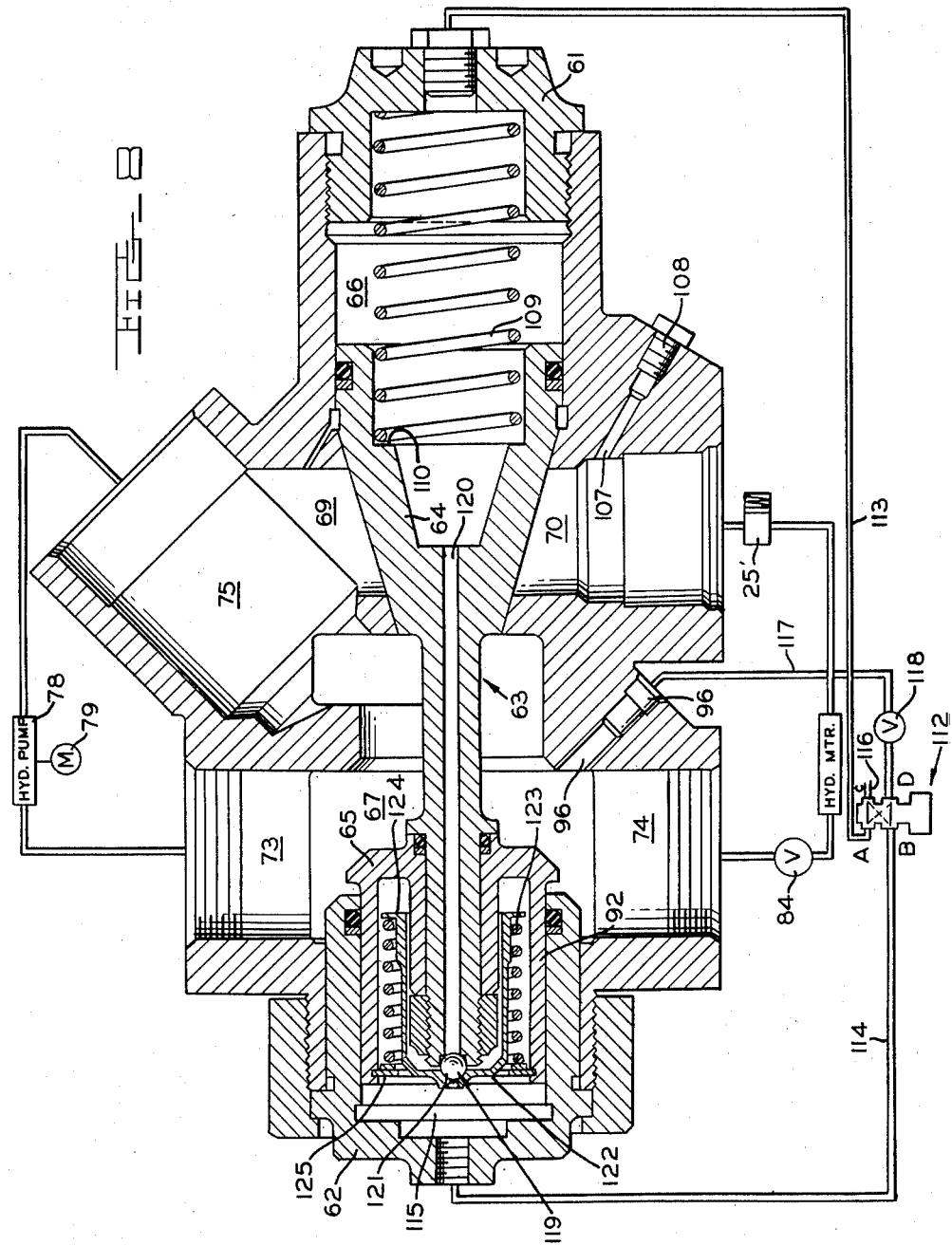
Figure 4 is a longitudinal sectional view through a modified form of valve assembly and illustrating the hydraulic system diagrammatically.

Referring first to the embodiment of the invention shown in Figures 1-3 inclusive, the numeral 10 designates a shut-off valve assembly comprising an elongated cylinder 11 and a valve member 12 slidably supported in the cylinder 11. The outer ends of the cylinder 11 are open and one end is normally closed by a plug 13 having a portion threadably engageable with the inner wall of the cylinder. The plug 13 also has an annular groove 14 in the periphery thereof for receiving an O-ring seal 15 which engages the inner wall of the cylinder in the assembled position of the plug to prevent the escape of hydraulic fluid medium from the adjacent end of the cylinder. The opposite end of the cylinder 11 is closed by a disc 16 which is held in place by a snap ring 17 and is fashioned with a pressure relief port 18.

The cylinder 11 is provided intermediate the ends thereof with diametrically opposed outwardly projecting bosses 19 and 20. The boss 19 is adapted to project through an opening formed in a fire wall 21 and is axially bored to provide a pressure outlet port 22. The boss 20 is axially bored to provide a pressure inlet port 23 which is aligned with the outlet port 22 and is adapted for connection to the delivery side of a hydraulic motor 24 by a fluid conducting line 25 containing a pressurized reservoir 25′. The intake side of the hydraulic motor 24 is connected by a fluid conducting line 26 to the discharge side of a hydraulic pump 27 having the intake side connected to the outlet port 22 by a fluid conducting line 28. The hydraulic pump 27 is located in a compartment isolated by the fire wall 21 and the valve cylinder 11 is secured in any suitable manner (not shown) to the front side of the wall 21. In any case, a check valve 29 is located in the fluid conducting line 26 and prevents reverse flow of hydraulic fluid from the motor 24 to the pump 27.

The inner ends of the ports 22 and 23 open into the cylinder 11 through a partition 30 projecting into the cylinder and having a bore 31 therethrough coaxially arranged with respect to the axis of the cylinder. The bore 31 is frusto-conical in shape and has the end of greatest diameter facing the plug 13. The inner surface of the bore 31 surrounding the outlet port 22 forms a conically shaped seat 32 and the inner surface of the bore 31 surrounding the port 23 forms a similar valve seat 33.

The valve member 12 has a part 34 which, for the purpose of simplicity, is shown as formed integral with the valve member 12 and in any case is provided with a cylindrical portion 35 at the outer end of a diameter to slidably engage the inner surface of the cylinder 11. The inner end of the part 34 is frusto-conical in shape and is fashioned to engage the valve seats 32, 33 to effectively close communication through the ports 22 and 23 in one position of the valve member 12. The cylindrical outer end portion 35 of the part 34 is fashioned with an annular groove 36 in the periphery thereof and an O-ring seal 37 is supported within the groove in a position to engage the adjacent inner wall of the cylinder 11. The arrangement is such that the outer end of the valve part 34 cooperates with the plug 13 to form a chamber 38 in the cylinder 11 and the O-ring seal 37 is positioned to prevent the escape of fluid under pressure past the valve part 34 into or out of the chamber 38.

A second chamber 39 is provided in the cylinder 11 at the side of the partition 30 opposite the chamber 38. Slidably supported within the chamber 39 is a second valve part 40 secured on the valve member 12 for movement as a unit with the latter and having an annular groove 41 in the periphery thereof for receiving an O-ring seal 42. The periphery of the valve part 40 slidably engages the adjacent inner wall of the cylinder 11 and the O-ring seal 42 prevents the escape of fluid under pressure from the space in the chamber 39 at the inner side of the valve part 40 to the space in the chamber 39 at the outer side of the valve part 40.

The valve member 12 is moved from the open position thereof shown in Figure 1 of the drawings to its closed position wherein the part 34 engages the seats 32 and 33 by fluid under pressure admitted to the chamber 38 at the outer end of the valve part 34. As shown in Figure 3 of the drawings, the end of the cylinder adjacent the plug 13 is formed with a boss 43 and this boss is fashioned with a pressure inlet opening 44 which communicates with the chamber 38 adjacent the inner end of the plug 13. The pressure inlet opening 44 is connected to the fluid conducting line 26 by a fluid line 45 and a three-way valve 46 is installed in the line 45, as shown in Figure 1 of the drawings. When the valve 46 is in the position thereof shown in Figure 1 the fluid line 45 is closed and the pressure inlet port 44 is connected to a vent indicated by the numeral 47. However, when the valve 46 is rotated in one direction it serves to connect the line 45 to the pressure inlet opening 44 so that fluid under pressure is admitted to the chamber 38 at the outer side of the valve part 34. As a result the valve member 12 is moved to a position wherein the part 34 closes the ports 22 and 23. Reverse flow of fluid from the chamber 38 through the pressure inlet port 44 is prevented by a check valve 48 supported within the boss 43 in the manner clearly shown in Figure 3 of the drawings. Thus, the valve member 12 is held in its closed position regardless of failure of the valve 46 or associated fluid pressure supply lines.

In order to release the pressure trapped in the chamber 38, a bleeder valve 49 is threaded into a bore formed in the plug 13. The bore communicates with the interior of the chamber 38 through a passage 50 leaving a valve seat normally engaged by the inner end of the bleeder valve to prevent fluid flow through the passage 50. The arrangement is such that loosening of the bleeder valve 49 in the plug 13 opens the passage 50 and allows the pressure in the chamber 38 to drop.

When the pressure in the chamber 38 is exhausted through the bleeder valve 49, the valve member is moved to its open position shown in Figure 1 of the drawings by a spring 51 located within the cylinder 11 outwardly beyond the valve part 40. The outer end of the spring abuts the disc 16 and the inner end of the spring engages a retainer 52 having the central portion acting on the adjacent end of the valve member 12. As shown in Figure 1 of the drawings, the central portion of the retainer is fashioned to house a thermal relief valve in the form of a ball 53 engageable with the adjacent outer end of the valve member 12 and normally closing a relief passage 54 communicating with the interior of the chamber 38. The arrangement is such that when the valve member 12 is in its closed position and the fluid under pressure in the chamber 38 expands beyond a predetermined temperature, the valve 53 opens against the action of the spring 51 to relieve the pressure in the chamber 38. An increase in pressure beyond the desired volume in the chamber 38 may be caused by a substantial increase in temperature due to fire or may result from some other cause and, in any case, is relieved by the valve 53.

When the valve member 12 is in its open position shown in Figure 1 of the drawings, it will be noted that the fluid under pressure flowing through the ports 22 and 23 acts on both of the valve parts 34 and 40. In the present instance, these parts are of the same diameter so that the valve member is balanced and there is no tendency for the fluid under pressure existing between the O-ring seals 37 and 42 to move the valve member in either direction.

Referring again to Figure 1 of the drawings, it will be noted that the space in the chamber 39 at the inner side of the valve member 40 communicates with the outlet port 22 through a port 55 so that any fluid under pressure escaping into the chamber 39 past the valve seats 32 and 33 in the closed position of the valve member 12 will not increase the pressure in the chamber 39 or, in other words, does not increase the closing force acting on the valve member 12. It will also be noted that when the valve member 12 is in its closed position an annular chamber 56 is provided between the O-ring seal 37 and the valve seats 32 and 33. This chamber is also connected to the outlet port 22 by a passage 57 so that any escape of fluid under pressure into the chamber 56 is prevented from building up to such a point that it interferes with movement of the valve member 12 to its open position upon a drop in pressure in the chamber 38.

In the embodiment of the invention shown in Figures 4 and 5 of the drawings, the numeral 60 designates a cylinder closed at opposite ends by plugs 61 and 62, respectively. Slidably supported in the cylinder 60 is a valve member 63 having a valve part 64 at the end thereof adjacent the plug 61 and having a second valve part 65 adjacent the plug 62. It will be noted that the valve part 64 corresponds to the valve part 34 previously described and operates in a chamber 66 formed in the cylinder 60 adjacent the plug 61. The valve part 65 operates in a chamber 67 formed in the cylinder 60 adjacent the plug 62. As in the above described embodiment of the invention, an O-ring 68 is provided on the valve part 64 to form a fluid tight seal between the outer end portion of the part 64 and the adjacent wall of the cylinder 60.

The valve part 64 controls the flow of fluid through outlet ports 69 and 70 which are formed in the cylinder 60 in the same manner as the ports 22 and 23 previously described in connection with the first embodiment of this invention. The construction is such that when the valve member 63 is moved to its closed position, the frusto-conical portion of the valve part 64 engages tapered seats 71 and 72 respectively surrounding the inner ends of the ports 69 and 70. The cylinder 60 is also formed with diametrically opposed aligned pressure ports 73 and 74 arranged to communicate with the chamber 67. The pressure inlet port 73 communicates with the outlet port 69 through a by-pass 75 formed in the body of the valve assembly and connected to the chamber 67 through a port 76 having an annular valve seat 77.

When the valve assembly is installed in a hydraulic system the pressure inlet port 73 is connected to the discharge side of a hydraulic pump 78 having the intake side connected to the bypass 75 and driven by a motor 79. The pressure outlet port 74 is connected by a fluid line 80 to the intake side of a hydraulic motor 81 and the discharge side of the hydraulic motor is connected by a line 82 to the return port 70. The hydraulic motor 81 is also connected to the various accessories to be driven and these accessories are indicated generally by the numeral 83. Reverse flow of fluid under pressure from the hydraulic motor through the valve assembly is prevented by a check valve 84 connected in the line 80. The line 80 beyond the check valve 84 is also connected to the chamber 66 in the valve cylinder 60 at the outer side of the valve part 64 by a pressure line 85 having a three-way valve 86 therein.

The fluid pressure supply line 85 communicates with the chamber 66 through a check valve 87 supported by the plug 61 and corresponding to the check valve 48 of the first described form of the invention. The purpose of the check valve 87 is to trap fluid under pressure within the chamber 66 and prevent opening of the valve member 63 in the event of failure of the pressure supply line 85. In order to relieve the trapped pressure in the chamber 66, a bleeder valve 88 corresponding to the bleeder valve 49 is also mounted on the plug 61.

In order to move the valve member 63 to its closed position shown in Figure 4 of the drawings, the three-way valve 86 is operated to establish fluid flow through the pressure line 85. As a result fluid under pressure is introduced into the chamber 66 and the valve member 63 is moved in a direction to close the return ports 69 and 70. Closing movement of the valve member 63 is resisted by a coil spring 89 having the outer end abutting the plug 62 and having the inner end abutting valve part 65. In this connection, attention is called to the fact that the valve part 65 engages the valve seat 77 of the bypass 75 when the valve member 63 is in its open position shown in Figure 5 of the drawings. Hence, movement of the valve member 63 to its closed position with respect to the return ports 69 and 70 opens the bypass 75 enabling hydraulic fluid to flow from the discharge side of the pump 78 to the intake side when the valve assembly is in its closed position. This is advantageous in that it prevents damage to the hydraulic pump in the closed position of the valve assembly and, at the same time, affords ample protection in the event of failure of either of the fluid connections to the pump since only a relatively small amount of hydraulic fluid will escape from these lines. Also the recirculation of hydraulic fluid rendered possible by the by-pass 75 facilitates starting the motor 79 since it permits, in effect, disconnecting the hydraulic motor 81 and its associated load 83 during the starting operation.

When it is desired to return the valve member 63 to its open position shown in Figure 5 of the drawings, the three-way valve is again operated to close the pressure line 85 and connect the check valve 87 to a suitable vent. Also the bleeder valve 88 is opened to enable a sufficient drop in pressure in the chamber 66 to permit return movement of the valve member 63. As a result the valve part 65 engages the seat 77 and closes the bypass 75. The valve member 63 is held in its open position shown in Figure 5 of the drawings by the pressure of the fluid in the chamber 67 acting on the outer side of the valve part 65 and by the force of the spring 89. In this connection it will be noted that the fluid under pressure flowing through the return ports also acts on the inner surfaces of the valve parts 64 and 65 in the open position of the valve member 63. However, the area of the part 64 acted upon by the fluid under pressure is greater than the area of the inner face of the valve part 65 exposed to the same pressure. Moreover, the area of the outer surface of the valve part 65 exposed to the pressure in the chamber 67 tending to maintain the valve member 63 open is also greater than the area of the inner face of the valve part 65 exposed to the return port pressure. Thus, the valve member 63 is normally maintained in its open position shown in Figure 5 of the drawings. Attention is also called to the fact that the spaces at opposite sides of the seats 71 and 72 are vented to the bypass 75 by ports 90 and 91. Thus, when the valve member 63 is in its closed position there is no tendency for pressure to build up in the aforesaid spaces tending to open the valve member.

It will also be noted that provision is made to mechanically move the valve member 63 to its closed position shown in Figure 4 of the drawings. This is accomplished by a rod 91' slidably supported in a central bore formed in the cap 61 and having an inner end portion positioned to engage the adjacent outer end of the valve member 63 in response to inward sliding movement of the rod 91'. Thus, should any of the pressure lines become damaged to such an extent that fluid under pressure cannot be admitted to the chamber 66, the valve may be operated mechanically by the rod 91'.

It will be apparent from the foregoing that relatively high operating pressures are required to move the valve member 63 to its closed position shown in Figure 4 of the drawings and in cases where such high pressures are not available, the embodiment shown in Figures 6 and 7 of the drawings may be provided. Many of the parts of the modification shown in Figures 6 and 7 are similar to those previously described in connection with the embodiment shown in Figures 4 and 5 and in the interest of simplicity corresponding parts are indicated by the same reference numerals. The valve part 65 for closing the bypass 75 in the embodiment shown in Figures 6 and 7 is provided with an outwardly extending cylindrical portion 92 of reduced diameter which slidably engages within a cylindrical portion 93 projecting inwardly from the plug 62. An O-ring 94 is provided for establishing a fluid tight seal between the cylindrical portions 92 and 93. The arrangement is such that the area 95 of the valve part 65 exposed to the action of fluid under pressure flowing through the ports 73 and 74 in the open position (Figure 7) of the valve member 63, is considerably smaller than the corresponding area of the valve part 65 shown in Figures 4 and 5 of the drawings. Thus, the force resisting closing movement of the valve member 63 shown in Figures 6 and 7 of the drawings is considerably reduced, and this is advantageous in cases where high operating pressures are not available or desirable.

Also in the embodiment of the invention shown in Figures 6 and 7, a port 96 communicates with the pressure outlet port 74 and is connected to a three-way valve 97 by a pressure line 98. The three-way valve 97 is also connected by a pressure line 99 to a shuttle valve 100 which in turn is connected to the chamber 66 through a port formed in the plug 61. The shuttle valve 100 has an emergency port 101 which may be and preferably is connected to another source of fluid under pressure.

It follows from the above that when the valve 97 is in the position thereof shown in Figure 6 of the drawings fluid under pressure passes through the shuttle valve 100 into the chamber 66 and closes the emergency port 101. However, should the pressure lines 98, 99 fail, fluid under pressure is admitted to the shuttle valve through the emergency port 101 in which event the main port connected to the line 99 is closed by the shuttle valve.

Movement of the valve member 63 to its open position shown in Figure 7 of the drawing is accomplished by the spring 89 when the three-way valve 97 is moved to its position shown in Figure 7 of the drawings. When in the latter position the fluid line 99 is connected to a line 102 and the latter contains fluid under relatively low pressure insufficient to move the valve member 63 in its closing direction. However, this relatively low pressure in the chamber 66 acts on the valve part 64 tending to move the valve member 63 in its closing direction. In order to counteract the force applied to the valve part 64 by this relatively low pressure, the line 102 is connected by a line 103 to a port 104 formed in the plug 62. Hence, the relatively low pressure contained in the line 102 also supplements the action of the spring 89 tending to move the valve member 63 to its open position. As a result of the above arrangement, the spring 89 need not be of sufficient strength to counteract the relatively low pressure existing in the chamber 66 when the valve member 63 is in its open position and a greater valve closing force is obtainable with a relatively light spring.

It will be noted that the return port 70 also communicates with a passage 107 which is normally closed by a plug 108. In some instances it is feasible to operate the valve member 63 with relatively low pressures and in such cases the fluid line 98 may be connected to the passage 107 by removing the plug 108 and inserting the latter into the port 96. This arrangement would enable employing a less expensive three-way valve since the latter would not be required to operate under the high pressures existing at the pressure ports 73 and 74.

Structurally the valve disclosed in Figure 8 of the drawings is similar to the one shown in Figures 6 and 7, and the same reference numerals are used to designate corresponding parts. In Figure 8 of the drawings, the spring 89 (Figures 6 and 7) is omitted and a spring 109 is located within the chamber 66. The inner end of the spring 109 seats on a shoulder 110 formed on the valve part 64 and the outer end of the spring 109 engages the plug 61. The arrangement is such that the spring 109 normally urges the valve member 63 to a position wherein the return ports 69, 70 are closed by the valve part 64 and the bypass 75 is opened by the valve 65. It will be understood that under normal operating conditions, the spring 109 is prevented from closing the valve member 63 and opening the bypass valve 65 by the action of the fluid under pressure on the bypass valve 65 and on the area of the valve part 64 exposed to the fluid flowing through the return ports 69 and 70. The location of the spring 109 in a position to normally urge the valve member 63 closed and the bypass valve 65 to its open position has certain advantages which will become apparent as this description proceeds.

The numeral 112 in Figure 8 designates a solenoid operated four-way valve having ports A, B, C and D. The port A is connected to the chamber 66 by a conduit 113 and the port B is connected by a conduit 114 to a chamber 115 formed by the cooperation of the plug 62 with the cylindrical part 92 on the bypass valve 65. The port C is connected to a conduit 116 containing a predetermined back pressure similar to the line 102 in Figures 6 and 7 of the drawings. The port D is connected by a conduit 117 to the pressure port 96 through a check valve 118 arranged to permit fluid flow in the direction of the arrow and to prevent the flow of fluid in the opposite direction.

In the de-energized position of the valve 112 shown in Figure 8, the chamber 66 is connected to the conduit 116 which contains a pressure substantially less than the pressure required in the chamber 66 to close the valve member 63 and open the bypass valve 65. Also the pressure port 96 or chamber 67 is connected to the chamber 115 so that the relatively high pressure in the chamber 67 acts on the relatively large area of the outer surface of the bypass valve 65 to assist the pressure acting on the valve part 64 in holding the valve member 63 in its open position against the action of the spring 109. However, when the solenoid valve 112 is energized, the conduit 117 or pressure port 96 is connected to the chamber 66 (broken lines in Figure 8) and the relatively low back pressure conduit 116 is connected to the chamber 115. Thus, the force exerted on the bypass valve 65 tending to resist closing of the valve member 63 is reduced and the pressure in the chamber 66 at the outer end of the valve part 64 is materially increased so that the valve member 63 is moved to its closed position wherein the return ports 69, 70 are closed and wherein the bypass 75 is opened by the valve 65. The fluid under pressure admitted to the chamber 66 through the conduit 113 is trapped in the chamber 66 by the check valve 118. Thus, the valve member 63 is held in its closed position with respect to the return ports 69, 70 even though the pressure supply conduit 117 or high pressure source should fail for any reason. Moreover, due to the fact that the spring 109 assists the force applied by the relatively high pressure trapped in the chamber 66 to hold the valve member 63 in its closed position relative to the return ports 69 and 70, the valve member 63 remains closed even in instances where the fluid pressure at the return inlet port 70 exceeds the pressure trapped within the chamber 66.

The valve structure shown in Figure 8 is also provided with a pressure relief valve 119 similar to the valve 53 shown in Figure 1 of the drawings. In detail, the numeral 120 designates a passage extending axially through the valve member 63 in a manner to connect the chamber 66 with the chamber 115 previously described as formed by the cooperation of the plug 62 with the cylindrical part 92 on the bypass valve 65. The passage 120 is normally closed by a ball valve 121 yieldably urged to its closed position by a cap 122 and a spring 123. The cap 122 has an inwardly extending cylindrical wall concentric with the adjacent end of the valve member and terminating in a radially outwardly extending flange 124. The flange 124 forms an abutment for the inner end of the spring 123 and a snap ring 125 is secured to the outer end of the part 92 for engagement by the outer end of the spring 123. The arrangement is such that the ball 121 opens to relieve the pressure in the chamber 66 should this pressure approach destructive proportions for any reason. It will also be noted that the spring 123 is supported in a manner such that it does not influence movement of the valve member 63 in either direction.

What I claim as my invention is:

A valve assembly for closing a fluid pressure supply conduit of a pressure line disposed in fluid circulating relation to a fluid pressure source and a fluid pressure operated device, comprising a body having a cylinder provided with inlet and outlet ports intermediate the ends thereof, valve seats respectively surrounding the ports within the cylinder and tapered axially of the cylinder, a valve member mounted in the cylinder for sliding movement axially of the cylinder and having a tapered part engageable with the seats to close communication through said ports upon movement of the valve member in a closing direction relative to the cylinder, said cylinder having a first chamber at the end of the tapered part of greatest diameter and having a second chamber at the opposite end of the tapered part provided with a first inlet opening and an outlet opening adapted to be connected respectively to said pressure source and pressure operated device, said body having a further inlet opening for fluid under pressure communicating with the first chamber and operable to admit fluid under pressure into the first chamber to move the valve member in its closing direction toward the second chamber, manually operable means mechanically connected to the valve member for moving the latter in a direction to close the inlet and outlet ports, and means including a valve-controlled conduit adapted to connect said second chamber and said first inlet opening with said pressure source and thereby bypass said pressure operated device.

References Cited in the file of this patent
UNITED STATES PATENTS

| | | |
|---|---|---|
| 306,880 | Wallace | Oct. 21, 1884 |
| 617,437 | Cochran | Jan. 10, 1899 |
| 653,187 | Smith | July 3, 1900 |
| 724,318 | McAuley | Mar. 31, 1903 |
| 1,196,121 | Larsen | Aug. 29, 1916 |
| 1,339,798 | Thompson | May 11, 1920 |
| 1,829,655 | Huguenin | Oct. 27, 1931 |
| 2,020,773 | Ernst | Nov. 12, 1935 |
| 2,319,551 | Linden | May 18, 1943 |
| 2,744,719 | McRae | May 8, 1956 |

FOREIGN PATENTS

| | | |
|---|---|---|
| 639,047 | France | 1928 |
| 640,848 | Germany | Jan. 13, 1937 |